(12) United States Patent
Zhang et al.

(10) Patent No.: US 11,163,959 B2
(45) Date of Patent: Nov. 2, 2021

(54) COGNITIVE PREDICTIVE ASSISTANCE FOR WORD MEANINGS

(71) Applicant: International Business Machines Corporation, Armonk, NY (US)

(72) Inventors: Gong Zhang, Beijing (CN); Tao Zhang, Beijing (CN); Yang Qi, Beijing (CN); Li Peng, Beijing (CN); Xiao Guang Luo, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/205,322

(22) Filed: Nov. 30, 2018

(65) Prior Publication Data

US 2020/0175111 A1    Jun. 4, 2020

(51) Int. Cl.
*G06F 40/242*    (2020.01)
*G06F 40/30*    (2020.01)

(52) U.S. Cl.
CPC .................... *G06F 40/30* (2020.01)

(58) Field of Classification Search
CPC ............................................... G06F 17/2785
USPC ....................................................... 704/9, 2
See application file for complete search history.

(56) References Cited

U.S. PATENT DOCUMENTS

| | | | | |
|---|---|---|---|---|
| 5,359,514 A | * | 10/1994 | Manthuruthil | G06F 40/247 704/10 |
| 5,680,511 A | * | 10/1997 | Baker | G10L 15/1815 704/257 |
| 6,128,635 A | * | 10/2000 | Ikeno | G06F 16/94 715/246 |
| 7,120,582 B1 | * | 10/2006 | Young | G10L 15/063 704/255 |
| 9,514,121 B2 | | 12/2016 | Puppin | |
| 9,524,298 B2 | | 12/2016 | Yu et al. | |
| 10,558,657 B1 | * | 2/2020 | Cheng | G06F 16/248 |
| 2004/0220919 A1 | * | 11/2004 | Kobayashi | G06F 16/313 |
| 2006/0063139 A1 | * | 3/2006 | Carver | G09B 17/00 434/178 |
| 2007/0128899 A1 | * | 6/2007 | Mayer | G06F 9/4406 439/152 |

(Continued)

FOREIGN PATENT DOCUMENTS

EP          2645270 A1    10/2013
WO     2017209937 A1    12/2017

OTHER PUBLICATIONS

Mell et al., "The NIST Definition of Cloud Computing", National Institute of Standards and Technology, Special Publication 800-145, Sep. 2011, 7 pages.

*Primary Examiner* — Jakieda R Jackson
(74) *Attorney, Agent, or Firm* — Grant M. McNeilly

(57) ABSTRACT

A computer-implemented method for word meaning generation is provided. In this method, a vocabulary notebook is obtained, wherein the vocabulary notebook stores at least one existing word that has been looked up. A concerned category is then identified based on the vocabulary notebook. It will be further determined whether a new page to be displayed contains at least one new word belonging to the concerned category. And responsive to determining that the new page contains the at least one new word, a respective meaning of the at least one new word is generated.

20 Claims, 7 Drawing Sheets

(56) References Cited

U.S. PATENT DOCUMENTS

| | | | | |
|---|---|---|---|---|
| 2008/0243737 | A1* | 10/2008 | Rieman | G06F 15/16 |
| | | | | 706/18 |
| 2009/0171937 | A1* | 7/2009 | Chen | G06Q 10/107 |
| 2010/0010804 | A1* | 1/2010 | Friedman | G06F 40/284 |
| | | | | 704/9 |
| 2010/0228693 | A1* | 9/2010 | Dawson | G06F 17/2705 |
| | | | | 706/12 |
| 2012/0054672 | A1* | 3/2012 | McDowell | G09B 17/003 |
| | | | | 715/784 |
| 2012/0179455 | A1* | 7/2012 | Cha | G09B 19/06 |
| | | | | 704/10 |
| 2013/0060763 | A1* | 3/2013 | Chica | G06F 16/335 |
| | | | | 707/723 |
| 2013/0080471 | A1* | 3/2013 | Forte | G06F 21/6218 |
| | | | | 707/785 |
| 2013/0149681 | A1* | 6/2013 | Tinkler | G09B 7/04 |
| | | | | 434/167 |
| 2013/0226847 | A1* | 8/2013 | Cruse | G06N 5/04 |
| | | | | 706/12 |
| 2013/0253903 | A1* | 9/2013 | Stephen | G06F 17/27 |
| | | | | 704/2 |
| 2014/0278428 | A1* | 9/2014 | Rolland | G10L 15/26 |
| | | | | 704/257 |
| 2015/0026176 | A1* | 1/2015 | Bullock | G06F 16/93 |
| | | | | 707/736 |
| 2015/0220253 | A1* | 8/2015 | Landau | G06F 15/0291 |
| | | | | 715/204 |
| 2016/0179192 | A1* | 6/2016 | Wu | G06F 3/0483 |
| | | | | 345/156 |
| 2016/0293045 | A1* | 10/2016 | Wang | G09B 7/04 |
| 2016/0378720 | A1* | 12/2016 | Bacus | G06F 40/103 |
| | | | | 715/251 |
| 2017/0017642 | A1* | 1/2017 | Cunningham | G06F 17/289 |
| 2017/0024372 | A1* | 1/2017 | Bojja | G06F 40/263 |
| 2017/0186338 | A1* | 6/2017 | Treves | G09B 7/02 |
| 2017/0344530 | A1* | 11/2017 | Krasadakis | G06F 40/247 |
| 2018/0173696 | A1* | 6/2018 | Hosabettu | G06F 16/36 |
| 2018/0293907 | A1* | 10/2018 | Meltzer | G09B 5/12 |
| 2019/0138607 | A1* | 5/2019 | Zhang | G06N 3/0454 |
| 2019/0187952 | A1* | 6/2019 | Lal | G10L 13/00 |

* cited by examiner

COGNITIVE PREDICTIVE ASSISTANCE FOR WORD MEANINGS

BACKGROUND

Reading an e-book using an e-book reader can be convenient. For example, tools (for example, an electronic dictionary) that can assist reading can be integrated into the reader to improve reading efficiency and experience. Usually when a user reads a book by using an e-book reader and meets an unfamiliar word (or a term or phrase, hereinafter all referred to as a "word"), the user needs to highlight it (for example, by pressing the new word) so that the electronic dictionary can translate it for the user. However, when reading a professional article in a foreign language, or literature in area of expertise which contains a lot of rarely-used or field-specific words, the user may have to highlight the new words again and again to figure out what they mean. In the end, this repeated looking up of words may occupy a lot of time and may slow down reading speed and affect reader's experience.

SUMMARY

Example embodiments of the present disclosure provide a method, a system, and a computer program product for word meaning generation.

In an aspect, a computer-implemented method for word meaning generation is provided. In this method, a vocabulary notebook can be obtained, wherein the vocabulary notebook stores at least one existing word that has been looked up. A concerned category can be then identified based on the vocabulary notebook. It can be further determined whether a new page to be displayed contains at least one new word belonging to the concerned category. And responsive to determining that the new page contains the at least one new word, a respective meaning of the at least one new word can be generated.

Other embodiments and aspects, including but not limited to, computer systems and computer program products, are described in detail herein.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
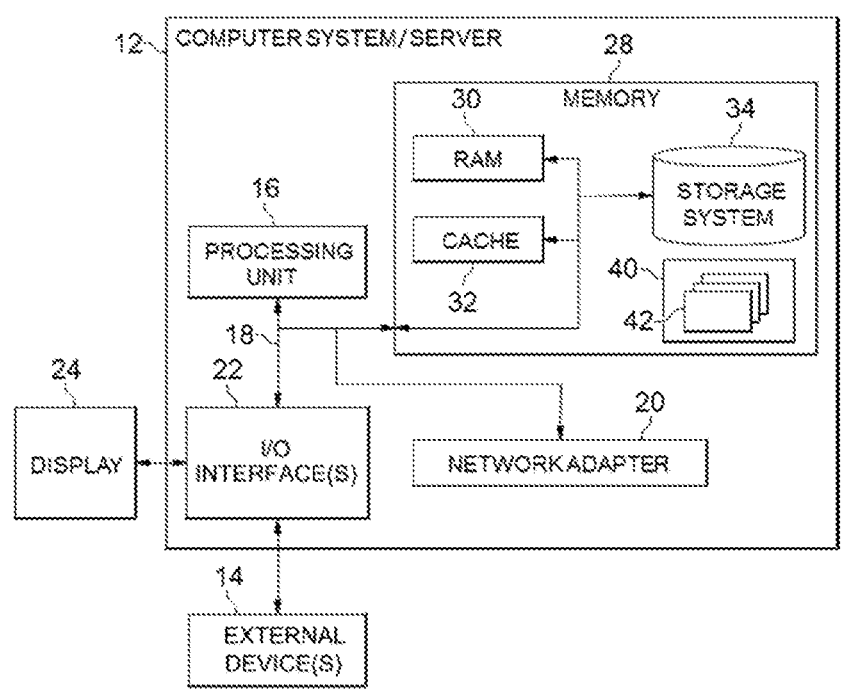
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
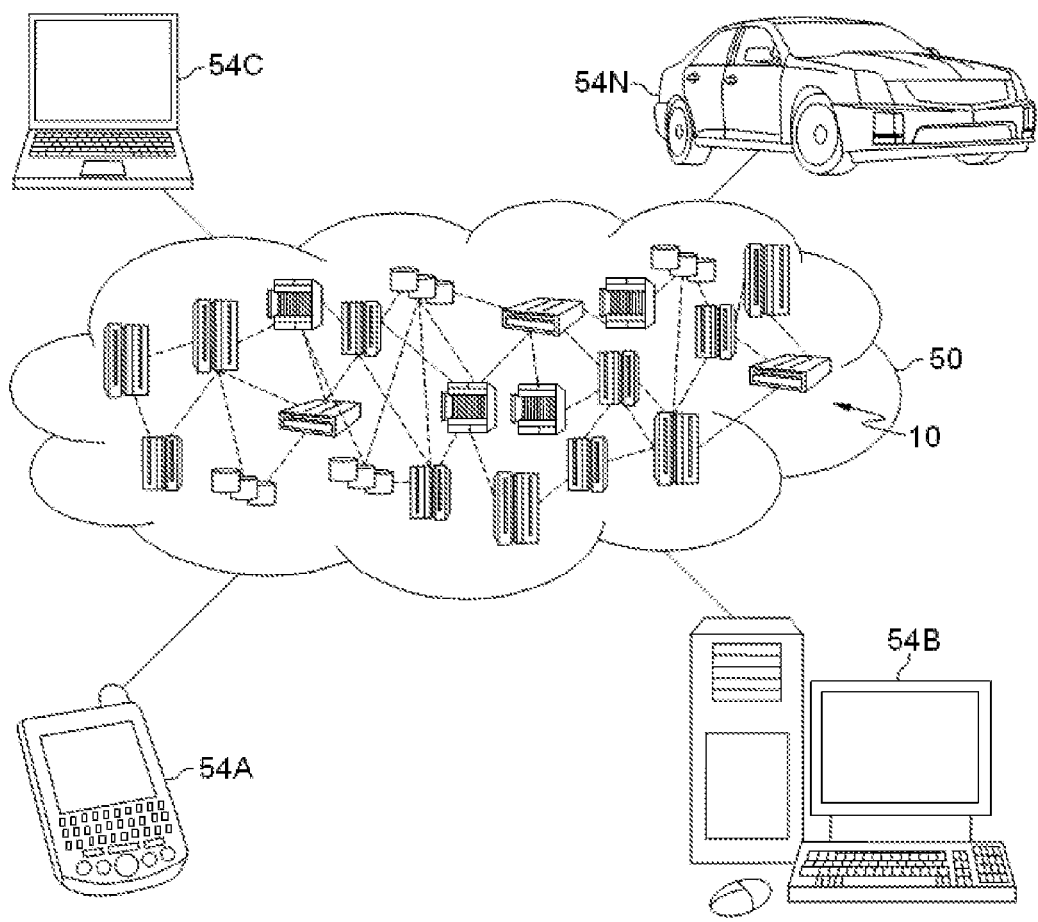
FIG. 2 depicts a cloud computing environment according to an embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
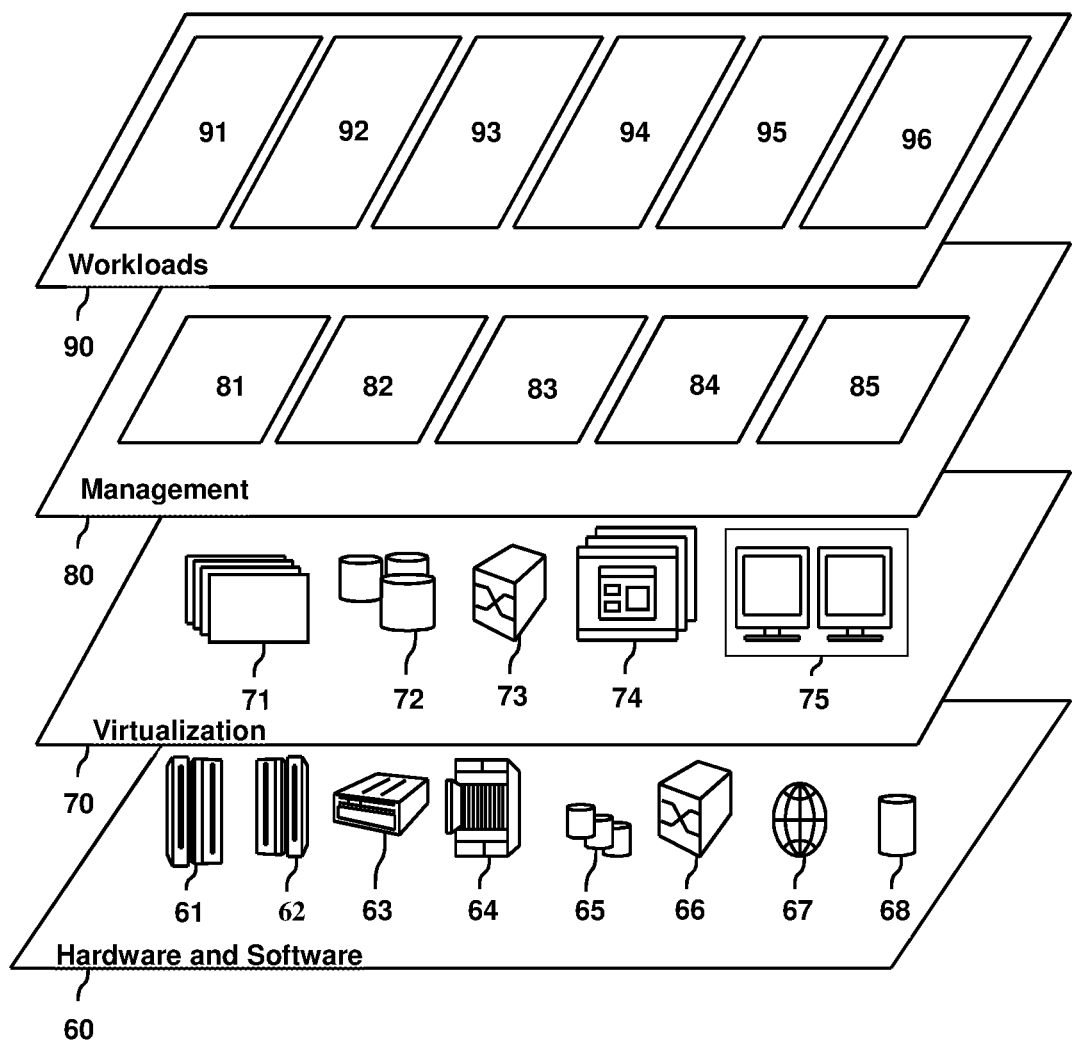
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and word meaning generation 96.

When a user highlights a word to look up its meaning, the e-book reader can automatically save a copy of the word and its meaning in a vocabulary notebook. The vocabulary notebook can be used as basis to predict a new word that may be unfamiliar to the user but that the user would be interested in and generate the meaning of the new word in advance to facilitate reading experience of the user.

With reference now to FIGS. 4A-7C, embodiments of the disclosure can be discussed in further detail.

Figure 4A:
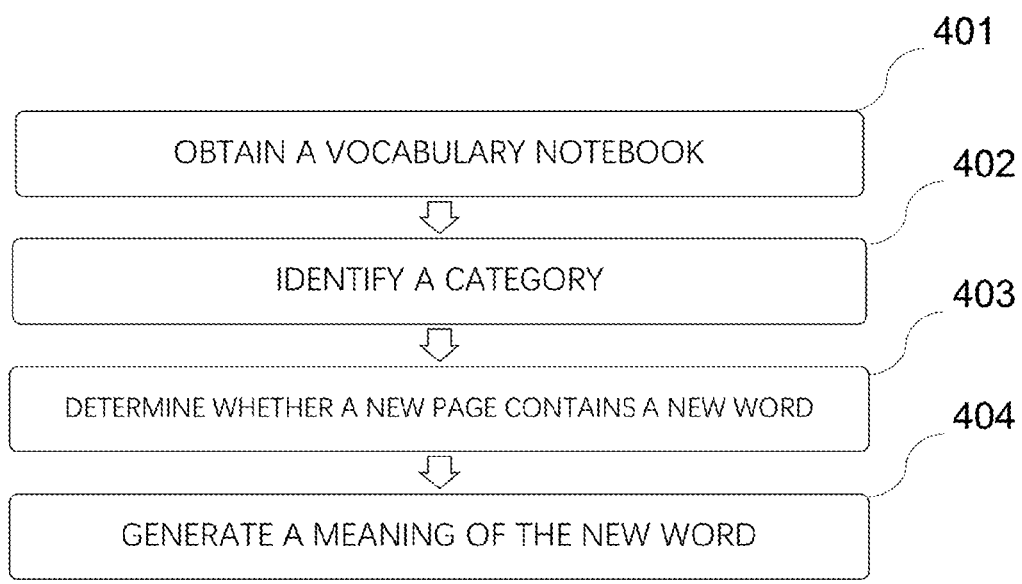
FIG. 4A illustrates an example flowchart for word meaning generation in accordance with an embodiment of the present disclosure.

FIG. 4A illustrates an example flowchart for word meaning generation in accordance with an embodiment of the present disclosure. At step 401, a vocabulary notebook of a user is obtained, wherein the vocabulary notebook stores at least one existing word that has been looked up. There could be many ways to store a word in a vocabulary notebook, for example, the user may highlight a word when reading an article, the word highlighted can be stored after action like clicking, pressing, putting a cursor on the work and so on. In another example, the user may separately look up a word in an electronic dictionary which could include the vocabulary notebook or be coupled with the vocabulary notebook.

In an embodiment, the vocabulary notebook may be a special vocabulary notebook which stores all existing words which have been looked up by the user from the same document (e.g., an article or a book, etc.). Then the prediction of new words, which can be performed later on, can be made based on the existing words in the same document, which, therefore makes the prediction more specialized and focused. The detail of this embodiment would be further illustrated later with reference to FIG. 4B.

In another embodiment, the vocabulary notebook may also be a general vocabulary notebook which stores existing words having been looked up by the user from different articles or different books within a certain period of time (such as a couple of months) or from the very beginning. In such embodiment, the vocabulary notebook can be enriched with various kinds of input from different resources, namely, all words that have been looked up by the user when reading different articles or books, collected together.

In yet another embodiment, the vocabulary notebook may also be a common vocabulary notebook which stores existing words that have been looked up by a group of people including or excluding the current user. Optionally, the group of people can be relevant to the current user who is reading an article, for example, the group can include people who may be in the same team/the same reading club, who may have friend relationship with the current user, who may be in the same grade with the current user, and the like. In this example, the size of the vocabulary notebook can be further enlarged. In another example, the group can further include people who have no relevance with the current user, so that personalization of the vocabulary notebook is diluted in return with increase of the size of the vocabulary notebook.

At step 402, a concerned category is identified based on the vocabulary notebook. The vocabulary notebook can be used as a basis to predict new words that might be unknown to the user but could be important to the user. So the reading experience of the user can be improved by automatically showing the user the meanings of the new words. According to an embodiment of this disclosure, not all of the new words that could be unknown to the user need to be predicted and further translated or annotated for the user, because not every unknown new word that may be important or interesting to the user. For example, for some words, although they are unknown to the user, the user does not need to understand the exact meaning of them. Therefore, the user has never looked up the words in the dictionary, so the category of such kinds of new words might not be important and identified. The important category can be identified based on many factors, like difficulty level, subject, relevance with an existing word, and the like, which will be further illustrated in detail below.

Figure 6:
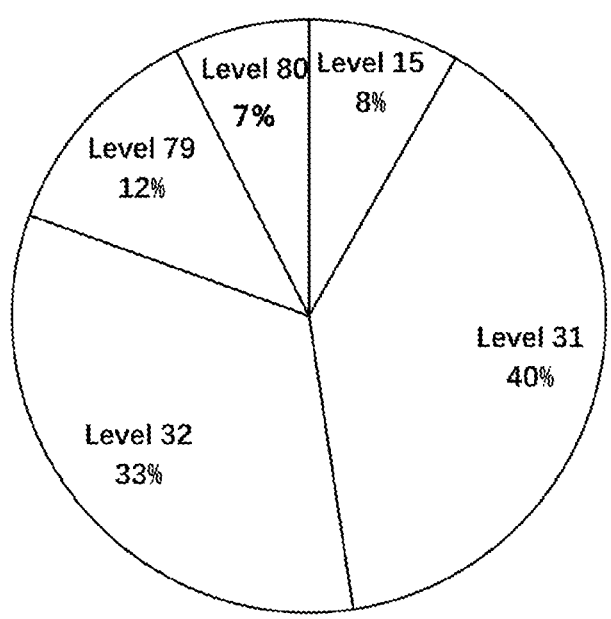
FIG. 6 illustrates an example pie chart regarding distribution of the number of existing words in a vocabulary notebook in accordance with an embodiment of the present disclosure.

According to an embodiment of this disclosure, the step of identifying the concerned category at block 402 can be performed as follows: firstly a respective difficulty level of the at least one existing word in the vocabulary notebook is determined, secondly existing words with a higher difficulty level can be selected, and thirdly the concerned category can be determined based on the selected higher difficulty level. FIG. 6 illustrates an example pie chart regarding distribution of the number of existing words in a vocabulary notebook in accordance with an embodiment of the present disclosure. In this example, all the words are categorized from level 1 to level 100 according to its difficulty. The process of categorization can be performed within this method or be performed in advance.

Table 1 below shows an example statistic with regard to existing words in a vocabulary notebook. Words in difficulty level 15 have been looked up by the user 19 times in the past, which accounts to 8% of the total times any existing word has been looked up; words in difficulty level 31 have been looked up by the user for 91 times in the past, which accounts to 40% of total times for all existing words; and so on. It can be noted that words in the difficulty level 31 are most looked up the user. The statistical results have also been shown in pie chart of FIG. 6. It could be inferred that words in difficulty level 31 are most likely to be important but unknown the user.

TABLE 1

| | Total Times of Existing Words being Looked up in Different Levels | Percentage |
| --- | --- | --- |
| Level 15 | 19 | 8% |
| Level 31 | 91 | 40% |
| Level 32 | 76 | 33% |
| Level 79 | 28 | 12% |
| Level 80 | 17 | 7% |

Additionally, the statistics can also be made based on the number of existing words being looked up, so that if the same word has been looked up by the user for multiple times, then only "1" will be counted. For example, if the user has looked up one word in Level 15 3 times, looked up another word in Level 31 7 times, then Table 1 can be slightly updated to Table 2 (which is based on the number of different existing words that have been looked up instead of the total number of times existing words have been looked up).

TABLE 2

| | Number of Different Existing Words being Looked up in Different Levels | Percentage |
| --- | --- | --- |
| Level 15 | 17 | 8% |
| Level 31 | 85 | 38% |
| Level 32 | 76 | 34% |
| Level 79 | 28 | 13% |
| Level 80 | 17 | 8% |

Therefore, the important but unknown category (also known as the "concerned category") can correspond to a difficulty level which is the same as the selected difficulty level. In above example, the concerned category can correspond to difficulty level 31. Optionally, the concerned category can correspond to difficulty levels which include the selected difficulty level, for example difficulty levels 31±1, namely, difficulty levels 30-32. In another example, the concerned category can correspond to all difficulty levels which are the same as or higher than the selected difficulty level, namely, difficulty levels 31-100.

Some users may be very familiar with words in one subject but not familiar with words in another. For example, a healthcare doctor could be very familiar with words in healthcare area but could be unfamiliar with words in computer science. Therefore, the concerned category could be determined based on subjects instead of difficulty levels. According to another embodiment of this disclosure, the step of identifying the concerned category further comprises determining a respective subject of the at least one existing word. Then one or more subjects which cover more existing words compared with other subject(s) are selected. For example, a subject containing the largest number of existing words is selected. The concerned category is, therefore, determined based on the selected subject. For example, there are 4 subjects determined for the existing words, namely, "natural language processing", "healthcare", "deep learning", "transportation" as shown in Table 3 below, wherein the subject "deep learning" includes the largest number of existing words and may be determined as the concerned category. Optionally multiple subjects can be selected based on the percentages they account to, for example, both "deep learning" and "natural language processing" can be finally determined to be covered by the concerned category.

TABLE 3

| Subject | Number of Existing Words | Percentage |
| --- | --- | --- |
| Natural Language Processing | 56 | 25% |
| Healthcare | 45 | 20% |
| Deep learning | 109 | 50% |
| Transportation | 10 | 5% |

In yet another embodiment of this disclosure, it might be difficult to determine the concerned category according to difficulty level or subject, but there can be some kinds of relevance with at least one existing word looked up by the user. Therefore, the step of identifying the concerned category at block 402 could comprise identifying a model which can determine relevance between two words. Then, the concerned category is determined to include a word whose relevance with at least one existing word is beyond a threshold. There are many existing technologies which could be used to determine relevance between two different words, which, therefore, will not be illustrated in further detail hereinafter.

It should be noted that above embodiments are described for illustration purpose, other embodiments which can be used to determine the concerned category can also be adopted here.

At step 403, it is determined whether a new page to be displayed to the user contains at least one new word belonging to the concerned category. The new page can be, for example, a text page in a document (like an article, or a book, etc.) to be displayed, or a portion of a text page to be displayed in a display window, or a plurality of text pages to be displayed in the display window. Step 403 can further comprise determining whether a word in the new page is the new word which belongs to the concerned category. For example, if the concerned category corresponds to the selected difficulty level(s), then the step of determining whether a word in the new page is the new word comprises determining whether a difficulty level of the word is the same as the selected difficulty level(s). If the concerned category corresponds to the selected subject(s), then the step of determining whether a word in the new page is a new word comprises determining whether the word falls into the selected subject(s). If the concerned category includes a word whose relevance with the existing word is beyond a threshold, then the step of determining whether a word in the new page is a new word comprises determining whether the relevance of the word with the existing word is beyond a threshold.

Responsive to determining that the new page contains the new word, a meaning of the new word can be generated at step 404. The meaning could be a translation of the new word, an annotation, connotation, or denotation of the new word, or any other expression (e.g., text, pictures, etc.) to describe the meaning of the new word visibly. Step 403 and/or 404 can be performed before the user flipping into the new page, so that overall layout of the new page can be adjusted with insertion of the meaning of the new word.

Additionally, the meaning of the new word is displayed when the new page is displayed before the user, so that the user can directly find the meaning of the new word that is probably unknown and that is probably important, therefore the reading experience can be improved.

Optionally, the meaning of the new word can be displayed in response with a trigger action from the user, like clicking, pressing, or putting a cursor on the new word. As it has been predicted that the user is very likely to look up the new word when reading, then the meaning of the new word has been prepared for checking by the user, which may save the time it takes to connect to the dictionary to query the new word, thus the speed of a dictionary look up operation could be increased if there are multiple new words on the new page to look up.

Figure 4B:
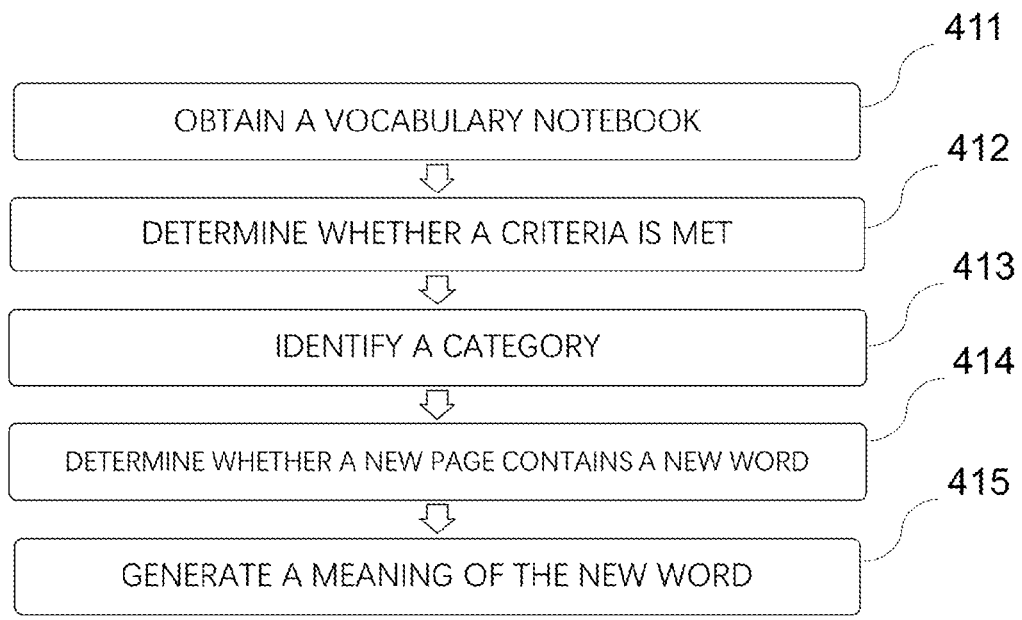
FIG. 4B illustrates another example flowchart for word meaning generation in accordance with another embodiment of the present disclosure.

FIG. 4B illustrates another example flowchart for word meaning generation in accordance with another embodiment of the present disclosure. In this embodiment, a new word is predicted based on a certain portion of a document has been read. It is likely the user reads one document carefully and thoroughly while reads another roughly and cursorily. Therefore, the same document can provide a more accurate basis to predict the word that could be unknown to the user but could be important to the user.

In this embodiment, the existing word is from at least one existing page, which is a page that has been read by the user, and both the at least one existing page and the new page are originated from the same document. The step of obtaining a vocabulary notebook of a user occurs at step 411, identifying a concerned category based on the vocabulary notebook occurs at step 413, determining whether a new page to be displayed to the user contains at least a new word belonging to the concerned category occurs at step 414 and generating a meaning of the new word occurs at step 415 responsive to determining that the new page contains the new word are the same as steps 401, 402, 403, and 404 respectively described with reference to FIG. 4A. Differently, in an embodiment described with FIG. 4B, it is further determined at step 412 whether at least one of the following criteria is met, including: whether the number of the at least one existing pages that have been read by the user reaches a predefined number of pages (for example 10+ pages), whether the percentage of the at least one existing page in the whole document (for example 10% pages of the whole document have been read) that have been read by the user reaches a predefined percentage, whether the number of the existing words in the document that have been looked up by the user reaches a predefined number (for example 20 existing words in the document have been looked up), or whether the percentage of the existing words in the document reaches a predefined percentage (for example 0.1% or $\frac{1}{1000}$ words of the whole document have been looked up by the user).

Responsive to at least one of the above criteria being met, the steps of 413, 414 and 415 can be further triggered. Optionally, if no any criteria can be met in step 412 at a given time, the method could continue to wait until at least one of the above criteria is met at a later time.

Figure 5:
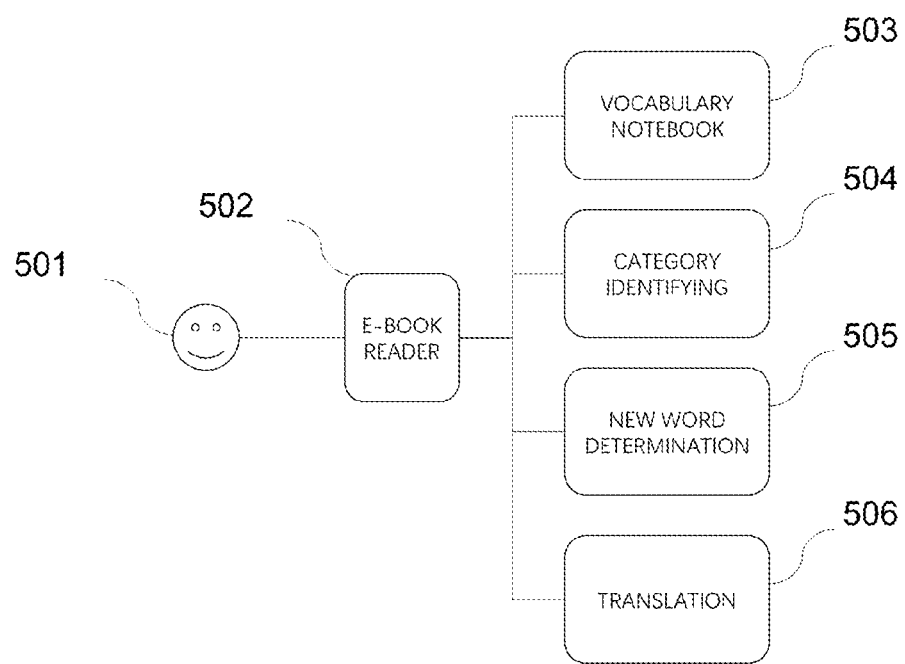
FIG. 5 illustrates an example diagram block including a system in accordance with an embodiment of the present disclosure.

FIG. 5 illustrates an example diagram block including a system in accordance with an embodiment of the present disclosure. A user 501 might look up one or more words when reading a document by using an e-book reader 502, and the words which have been looked up are stored in the vocabulary notebook 503. A category identifying module 504 could identify a concerned category based on the vocabulary notebook. A new word determination module 505 could determine whether a new page to be displayed to the user 501 contains a new word belonging to the concerned category. And responsive to determining that the new page contains the new word, a translation module 506 generates a meaning of the new word for displaying by the e-book reader 502.

Figure 7A:
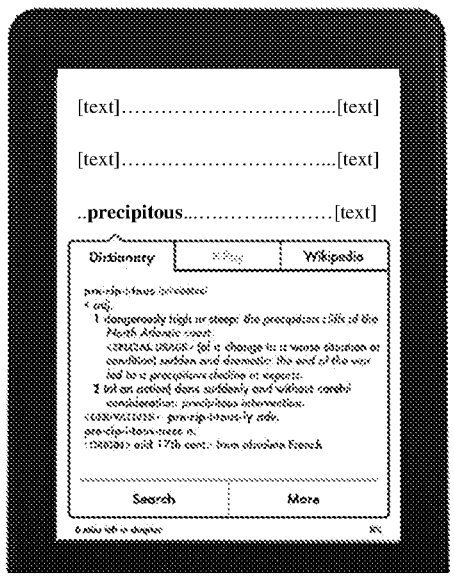
FIG. 7A illustrates an existing example user interface for looking up a word in an e-book reader in accordance with an embodiment of the present disclosure.

FIG. 7A illustrates an existing example user interface for looking up a word in an e-book reader. The user may need to look up meaning of a word in a dictionary when using an e-book reader by pressing, clicking or putting a cursor on the word. The e-book reader may pop-up a window to show the meaning of the word. In the illustrated embodiment, that word is "precipitous".

Figure 7B:
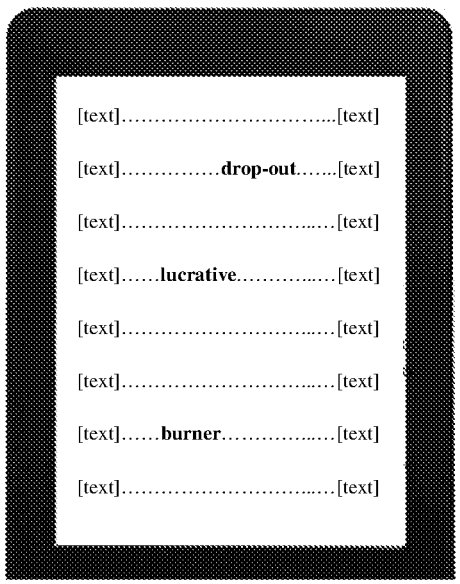
FIG. 7B illustrates an example of a new page that includes a new word in accordance with an embodiment of the present disclosure.

FIG. 7B illustrates an example of a new page in an e-book reader that could include a new word in accordance with an embodiment of the present disclosure. By using embodiments of this disclosure, the new words, which could be unknown to the user, but could be important to the user, can be determined. Bold words (like "drop-out", "lucrative", and "burner") illustrated in FIG. 7B could be determined as the new words. When the page in FIG. 7B is shown to the user, the new words determined can be shown in the plain words format or special format (like bold format shown in FIG. 7B currently).

Figure 7C:
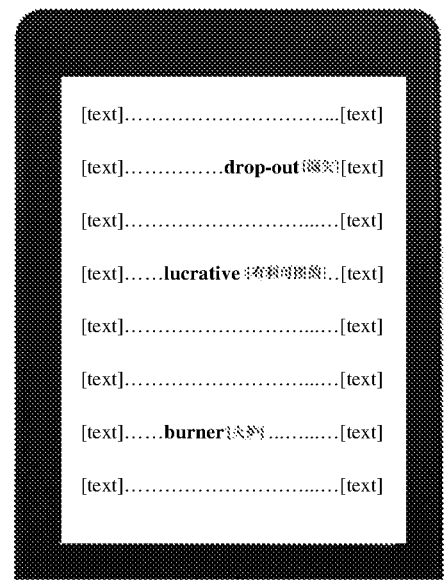
FIG. 7C illustrates an example user interface for displaying meanings of new words in accordance with an embodiment of the present disclosure.

FIG. 7C illustrates an example user interface in an e-book reader for displaying meanings of new words in accordance with an embodiment of the present disclosure. The Chinese translations of "drop-out", "lucrative", and "burner" are inserted into the new page as shown in FIG. 7C when the new page is displayed to the user.

It would also be noted that although some embodiments of this disclosure use e-book reader as an example for applying some embodiments of the present disclosure, embodiments of this disclosure can also be implemented by a software reader (like Microsoft® Word (.doc), Adobe® Acrobat® (.pdf), etc.).

It should be noted that the method or system of word meaning generation according to embodiments of this disclosure could be implemented by computer system/server 12 of FIG. 1.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for word meaning generation, comprising:
    obtaining a vocabulary notebook, wherein the vocabulary notebook stores at least one existing word that has been looked up and the at least one existing word is from at least one existing page that has been read;
    determining whether all four criteria are met, wherein the four criteria comprises:
        a first criterion specifying a percentage of the at least one existing page in the document that has been read has reached a predefined percentage;
        a second criterion specifying a number of the at least one existing page that has been read has reached a predefined number of pages;
        a third criterion specifying a number of the at least one existing word that has been looked up has reached a predefined number of words; and
        a fourth criterion specifying a percentage of the at least one existing word that has been looked up in the document has reached a predefined percentage;
    identifying a concerned category based on the vocabulary notebook;
    determining whether a new page to be displayed on a display of an e-book reader that is communicatively connected to the vocabulary notebook contains at least one new word that is not in the vocabulary notebook and that belongs to the concerned category, wherein both the at least one existing page and the new page originate from the same document;
    responsive to determining that the new page contains the at least one new word that is not in the vocabulary notebook and that belongs to the concerned category, and determining that all four criteria are met, generating a respective meaning of the at least one new word; and
    automatically modifying a display of the new page to display the respective meaning of the at least one new word on the display of the e-book reader.

2. The method of claim 1, wherein the identifying the concerned category comprises:
    determining a respective difficulty level of the at least one existing word;
    selecting a common difficulty level to which a largest number of existing words belong; and
    determining the concerned category based on the selected difficulty level.

3. The method of claim 2, wherein the concerned category corresponds to at least one of the following:
    a concerned difficulty level which is the same as the selected difficulty level,
    multiple difficulty levels which include the selected difficulty level, and
    all difficulty levels which are either the same as or higher than the selected difficulty level.

4. The method of claim 1, wherein the identifying the concerned category comprises:
    determining a respective subject of the at least one existing word;
    selecting one or more subjects which cover more existing words compared with one or more other subjects; and
    determining the concerned category based on the selected one or more subjects.

5. The method of claim 1, wherein the identifying the concerned category comprises:
    identifying a model for determining relevance between two words; and
    determining the concerned category, wherein the relevance between a word in the concerned category and the at least one existing word is beyond a threshold.

6. The method of claim 1, further comprises:
    displaying the respective meaning of the new word when the new page is displayed.

7. The method of claim 1, wherein the vocabulary notebook is a special vocabulary notebook that only stores words that originate from the same document.

8. The method of claim 1, wherein the vocabulary notebook stores at least one other word that has been looked up and the at least one other word is from another document.

9. The method of claim 1, wherein the vocabulary notebook only stores the at least one existing word for a predetermined amount of time.

10. A computer system for word meaning generation, the system comprising:
    an e-book reader including a display;
    a vocabulary notebook communicatively connected to the e-book reader;
    one or more processors;
    a memory coupled to at least one of the processors;
    a set of computer program instructions stored in the memory and executed by at least one of the processors in order to perform actions of:

obtaining the vocabulary notebook, wherein the vocabulary notebook stores at least one existing word that has been looked up and the at least one existing word is from at least one existing page that has been read;

determining whether all four criteria are met, wherein the four criteria comprises:

a first criterion specifying a percentage of the at least one existing page in the document that has been read has reached a predefined percentage;

a second criterion specifying a number of the at least one existing page that has been read has reached a predefined number of pages;

a third criterion specifying a number of the at least one existing words that has been looked up has reached a predefined number of words; and a fourth criterion specifying a percentage of the at least one existing words that has been looked up in the document has reached a predefined percentage;

identifying a concerned category based on the vocabulary notebook;

determining whether a new page to be displayed on a display of an e-book reader that is communicatively connected to the vocabulary notebook contains at least one new word that is not in the vocabulary notebook and that belongs to the concerned category, wherein both the at least one existing page and the new page originate from the same document;

responsive to determining that the new page contains the at least one new word that is not in the vocabulary notebook and that belongs to the concerned category, and determining that all four criteria are met, generating a respective meaning of the at least one new word; and automatically modifying a display of the new page to display the respective meaning of the at least one new word on the display of the e-book reader.

11. The system of claim 10, wherein the identifying the concerned category comprises:

determining a respective difficulty level of the at least one existing word in the vocabulary notebook;

selecting a common difficulty level to which a largest number of the at least one existing word belongs; and determining the concerned category based on the selected difficulty level.

12. The system of claim 11, wherein the concerned category corresponds to at least one of the following:

a concerned difficulty level which is the same as the selected difficulty level, multiple difficulty levels which include the selected difficulty level, and all difficulty levels which are either the same as or higher than the selected difficulty level.

13. The system of claim 10, wherein the identifying the concerned category comprises:

determining a at least one subject of the at least one existing word;

selecting one or more of the at least one subject which cover more existing words compared with other of the at least one subject; and determining the concerned category based on the selected one or more of the at least one subject.

14. The system of claim 10, wherein the identifying the concerned category comprises:

identifying a model for determining relevance between two words; and determining the concerned category, wherein the relevance between a word in the concerned category and at least one existing word is beyond a threshold.

15. The system of claim 10, the at least one of the processors further perform the action of:

displaying the respective meaning of the at least one new word when the new page is displayed.

16. A computer program product for word meaning generation, the computer program product comprising a computer readable storage medium having program instructions embodied therewith, the program instructions being executable by a computer to cause the computer to:

obtain a vocabulary notebook, wherein the vocabulary notebook stores at least one existing word that has been looked up and the at least one existing word is from at least one existing page that has been read;

determine whether all four criteria are met, wherein the four criteria comprises:

a first criterion specifying a percentage of the at least one existing page in the document that has been read has reached a predefined percentage;

a second criterion specifying a number of the at least one existing page that has been read has reached a predefined number of pages;

a third criterion specifying a number of the at least one existing word that has been looked up has reached a predefined number of words; and a fourth criterion specifying a percentage of the at least one existing word that has been looked up in the document has reached a predefined percentage;

identify a concerned category based on the vocabulary notebook;

determine whether a new page to be displayed on a display of an e-book reader that is communicatively connected to the vocabulary notebook contains at least one new word that is not in the vocabulary notebook and that belongs to the concerned category, wherein both the at least one existing page and the new page originate from the same document;

responsive to determining that the new page contains the at least one new word that is not in the vocabulary notebook and that belongs to the concerned category, and determining that all four criteria are met, generate a respective meaning of the at least one new word; and automatically modify a display of the new page to display the respective meaning of the at least one new word on the display of the e-book reader.

17. The computer program product of claim 16, wherein the identifying the concerned category further comprises program instructions, stored on the one or more computer readable storage media, to cause the computer to:

determine a respective difficulty level of the at least one existing word in the vocabulary notebook;

select a common difficulty level to which a largest number of existing words belong; and determine the concerned category based on the selected difficulty level.

18. The computer program product of claim 16, wherein the identifying the concerned category further comprises program instructions, stored on the one or more computer readable storage media, to cause the computer to:

determine a respective subject of the at least one existing word;

select one or more subjects which cover more existing words compared with one or more other subjects; and determine the concerned category based on the selected one or more subjects.

19. The computer program product of claim 16, wherein the identifying the concerned category comprises further comprises program instructions, stored on the one or more computer readable storage media, to cause the computer to:
- identify a model for determining relevance between two words; and
- determine the concerned category, wherein the relevance between a word in the concerned category and at least one existing word is beyond a threshold.

20. The computer program product of claim 16, the program instructions further cause the computer to:
- display the respective meaning of the at least one new word when the new page is displayed.

* * * * *